June 13, 1967     H. BERTUCH     3,325,145
METHOD OF ALIGNING OR REALIGNING MACHINES
Filed April 28, 1965     2 Sheets-Sheet 1

HANS BERTUCH
INVENTOR.

BY Darbo Robertson
& Vandenburgh
Attys

June 13, 1967 H. BERTUCH 3,325,145
METHOD OF ALIGNING OR REALIGNING MACHINES
Filed April 28, 1965 2 Sheets-Sheet 2

HANS BERTUCH
INVENTOR.

BY Darby, Robertson
& Vandenburgh
Attys

United States Patent Office 3,325,145
Patented June 13, 1967

3,325,145
METHOD OF ALIGNING OR REALIGNING MACHINES
Hans Bertuch, Opladen, Germany, assignor to Fixatorenbau Bertuch & Co. G.m.b.H., Opladen, Rhineland, Germany
Filed Apr. 28, 1965, Ser. No. 451,507
1 Claim. (Cl. 254—104)

This invention relates to a method and apparatus for aligning or realigning machines. With many machines an accurate alignment of the machine frame is important. Commonly, the machines are placed on a foundation which is not exactly level. This requires aligning the machine with respect to the foundation. Also by foundation displacement a realignment of the machine may become necessary.

To do this, various devices are known. In a prior art arrangement of this type a housing is provided which may for instance be embedded in concrete in a foundation. In such housing a wedge is slidable horizontally by means of a setscrew and the wedge surface has supported thereon a pressure body provided with a corresponding slant surface. The pressure body bears against the housing in a horizontal direction and is formed with a supporting surface for the machine pedestal at the top thereof. By adjusting the wedge the height of the supporting surface may be changed. Preferably between the pressure body and the supporting surface is a ball and socket arrangement so that the supporting surface may align with the surface of the machine pedestal mounted thereon. By means of a mounting screw in the form of a screw bolt, which in the prior art is centrally guided through the supporting surface and pressure body and extends through an oblong hole in the wedge, the machine pedestal may be drawn towards the pressure body.

For realigning the machine the screw bolt connection is loosened in the described prior art arrangement. Then follows a new alignment of the machine by means of the wedge and of the setscrew and thereupon the screw bolt connection is again tightened. This is rather complicated as, when realigning a machine a substantial number of such installing elements must possibly be simultaneously aligned anew. It is also disadvantageous in that during the aligning action the machine is practically without any support after the loosening of the screw bolt connection.

For this reason an arrangement has been provided wherein the pressure body is lifted by hydraulic means without loosening of the screw bolt connection by stretching the screw bolt. When doing so, the screw bolt is only stretched within its range of elasticity, and thus not up to or beyond the elastic limit. When so relieved, the wedge may be adjusted and therewith the height of the supporting surface may be changed. If the oil pressure is then relieved the machine pedestal is drawn to the supporting surface by the screw bolt tending to assume its original position again. Such hydraulic lifting requires quite considerable apparatus. The requirement of remaining below the elastic limit of the screw bolt greatly limits the possibility of adjustment with this prior art method.

A substantial factor for the valuation of such installing elements resides in the obtainable elasticity constant, the elements not being absolutely rigid, but elastic to a certain extent. Also supporting surfaces due to the existing roughness thereof possess a certain elasticity. In connection with the great masses involved here such elasticity constants may lead to natural vibrational frequencies which are still well within frequency ranges present in the operation of the machines, a fact which may become very disturbing.

It is the object of this invention to render possible an alignment or a realignment of machines avoiding at the same time the described disadvantages of the prior art. It is a further object of this invention to accomplish the installation in such a manner that a very high elasticity constant will be obtained.

The invention starts from a method of aligning (which term is used to include realigning) machines by means of a wedge shoe having a supporting surface for the machine pedestal, towards which surface the machine pedestal is drawn by means of a screw bolt connection, the height of such supporting surface being adjustable by a wedge without the loosening of the screw bolt connection by stretching the screw bolt, and consists in that the screw bolt is stretched beyond its elastic limit by adjustment of the wedge.

The method according to the invention is distinguished from the prior art method in two substantial points. The stretching of the screw bolt is directly effected by adjustment of the wedge. Therefore, the wedge is not relieved first by separate hydraulic means (which stretches the screw bolt) and then adjusted. Rather the force necessary for stretching the screw bolt is applied via the set screw, or traversing screw, and transmitted to the screw bolt via the wedge with suitable transmission. This, of course, results in a substantial simplification of the apparatus. Besides, the machine pedestal with the pressure body is at all times tightly resting on the wedge surface with the initial tension. The screw bolt is not stretched farther than that required by the wedge adjustment. The second feature made possible thereby consists in that there is a stretching beyond the elastic limit (of course not up to breaking limit), without the strength of the screw bolt connection being impaired. The invention is based on the discovery that this type of realignment is actually possible, i.e. that it is possible to stretch the screw bolt beyond its elastic limit via the wedge and that thereafter a satisfactory attachment of the machine to the installing element still exists.

The invention gives rise to a still further substantial advantage. Through the high contact pressure unevenness and roughness on the wedge and plane surfaces are removed. This becomes effective in an increase of the elasticity constant of the installation.

To be able to apply the forces necessary for stretching the screw bolt, a specific development of the device is of importance. Starting from a device for aligning or realigning machines, comprising a housing wherein a wedge is slidable by means of a setscrew and the wedge surface has supported thereon a pressure body provided with a corresponding slant surface, which body supports against the housing in a horizontal direction and is formed with a supporting surface for the machine pedestal, and further comprising a screw bolt by means of which the machine pedestal may be drawn to the pressure body, the invention provides that the setscrew is supported against the housing in stroke direction via an axial needle or ball bearing. For adjusting the wedge against the elastic force of the screw bolt, quite a considerable axial force must be applied to the setscrew which supports against the housing. This results in friction between setscrew and housing which would counteract a rotation of the setscrew. By the use of axial needle bearings this friction is reduced to such an extent that the setscrew is relatively easily adjustable even with the great forces to be applied.

To avoid on the other hand an unintentional adjustment of the setscrew, it is desirable that the setscrew be supported against the housing in a direction of lowering via a cup spring. In direction of lowering the forces to be transmitted are not so great so that the support via a cup spring is sufficient. On the other hand, the cup spring is effective to cause a restraint of the setscrew independent of the respective load. In further modification of the invention provision may be made, to achieve further smoothing and reduction of friction, that the sliding surfaces are treated with molybdenum disulphite.

An embodiment of a device according to the invention is presented in the drawings and described as follows.

Figure 1:
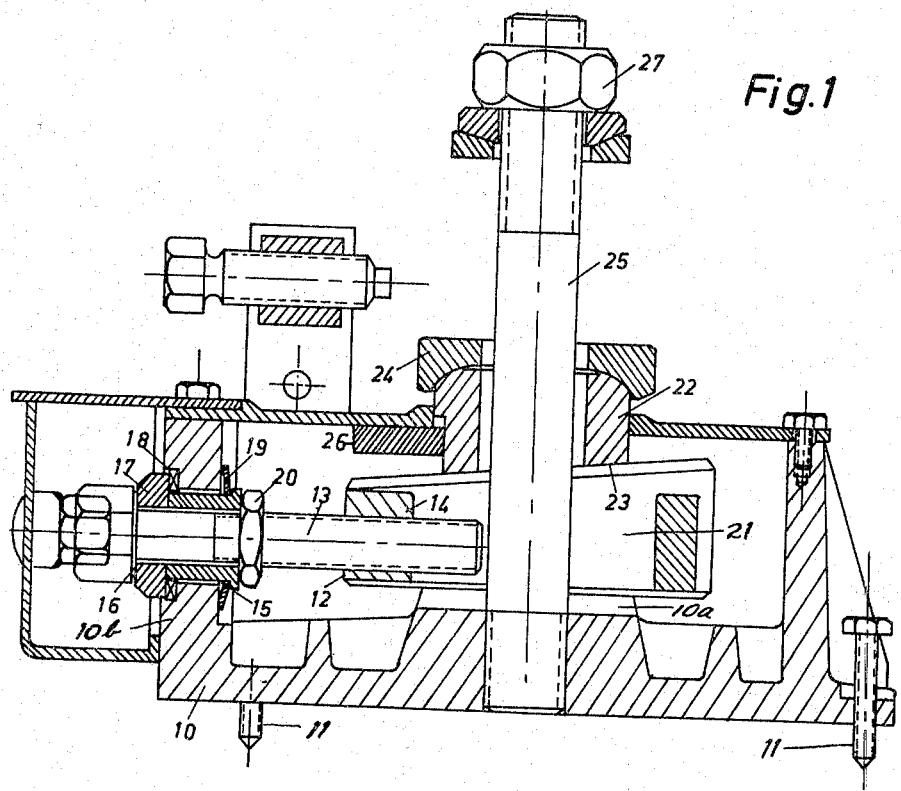
FIGURE 1 is a longitudinal sectional view through a device according to the invention.
Figure 2:
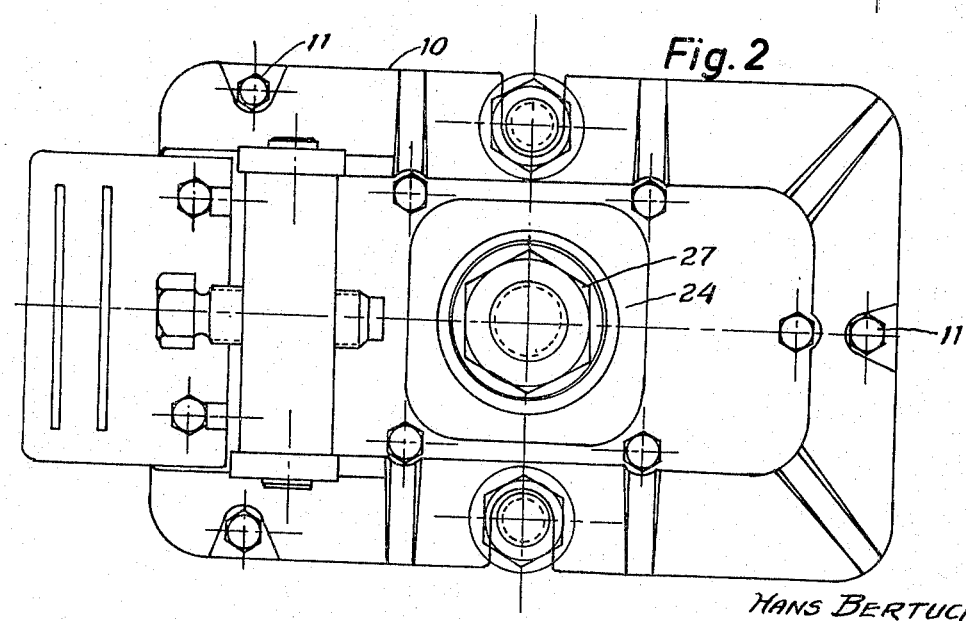
FIGURE 2 is a top view thereof.
Figure 3:
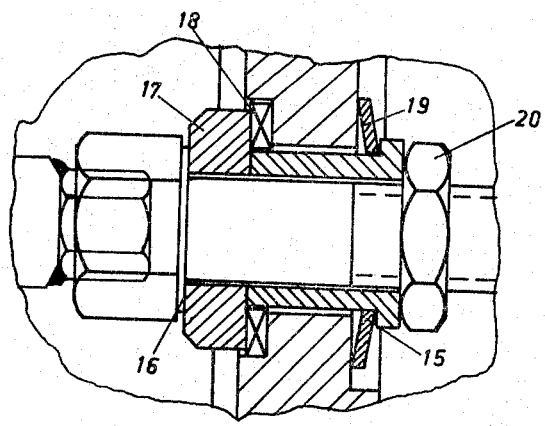
FIGURE 3 is a detail fragmentary view on an enlarged scale.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claim at the end hereof is intended as the chief aid toward this purpose; as it is this that meets the requirements of pointing out the parts, improvements, or combinations in which the inventive concepts are found.

Referring now to the drawings, reference numeral 10 designates a box-type housing or body which may be secured to a floor by means of screws 11. It may be embedded in a concrete foundation. Housing 10 has a wedge 12 slidably guided therein. Wedge 12 is supported on the base 10a of the housing. Sliding is effected by means of a traversing screw 13 threaded into a wall portion 14 of wedge 12. Screw 13 is rotatably mounted in a bearing sleeve 15 in turn supported by an end wall 10b of housing 10. Screw 13 has a shoulder 16 which bears against a ring 17. An axial needle or ball bearing (jointly referred to as an antifriction bearing) 18 is interposed between ring 17 and wall 10b of housing 10. The force required to draw wedge 12 to the right is transmitted between wall 10b and screw 13 through shoulder 16, ring 17 and bearing 18. A cup spring 19 (sometimes called a Belleville spring) between wall 10b and shoulder 15a of bearing sleeve 15 urges the sleeve against a nut 20 threaded onto screw 13. Spring 19 provides for a certain restraint also under lowering, if wedge 12 is moved rightwardly, thus preventing unintentional rotation. Traversing screw 13 also supports against the cup spring when moving wedge 12 to the right.

Wedge 12 is formed with an oblong central opening 21. A thrust member 22 is mounted on wedge 12 and has a bottom slanting surface 23 tapered at the same angle as that of the top surface of the wedge. The top of the thrust member body is convex and supports a correspondingly concave, dish-shaped body 24. The top of body 24 forms a planar supporting surface for the machine pedestal (not shown). Through a central aperture of member 22 and body 24 and the oblong hole 21 of wedge 12 extends a screw bolt or mounting screw 25 which is threaded into the bottom of housing 10. Bolt 25 (with its nut 27) holds the machine pedestal securely onto the upper plane surface of the dish-shaped body 24. A crossbar 26, secured to and integral with housing 10, bears against the side of thrust member 22 to hold it in place as the wedge 12 is moved to the left.

For the purpose of alignment or realignment the wedge 12 is drawn to the left in FIGURE 1 by means of traversing screw 13. When doing so, the pressure body formed by thrust member 22 and dish-shaped body 24 is forced upwardly. Thus, the machine is lifted with a simultaneous stretching of screw bolt 25. Thereby, a considerable range of adjustment may be obtained without the requirement of loosening nut 27 on bolt 25.

Invention is claimed as follows:

The method of aligning machines supported on an apparatus comprising a machine supporting surface raised and lowered by the transverse movement of a wedge with the machine being drawn against the surface and thus in turn against the wedge by means of a mounting bolt, said method comprising the step of moving said wedge in machine raising direction to an extent such that the bolt is stressed beyond its elastic limit but less than its breaking point.

References Cited

UNITED STATES PATENTS

| 1,987,726 | 1/1935 | Wilkerson et al. | 248—23 |
| 2,496,740 | 2/1950 | Morey | 74—424.8 |
| 2,499,131 | 2/1950 | Coles | 308—233 X |
| 3,123,339 | 3/1964 | DeMart | 254—29 |

FOREIGN PATENTS

| 937,134 | 12/1955 | Germany. |

OTHELL M. SIMPSON, *Primary Examiner.*